US012167260B2

(12) United States Patent
Maria

(10) Patent No.: US 12,167,260 B2
(45) Date of Patent: *Dec. 10, 2024

(54) GENERATING A CORE INSTANCE AT A FIRST ACCESS NETWORK CORE CONFIGURATOR TO FACILITATE OPERATION OF A SECOND ACCESS NETWORK

(71) Applicant: AT&T Mobility II LLC, Atlanta, GA (US)

(72) Inventor: Arturo Maria, Bellevue, WA (US)

(73) Assignee: AT&T Mobility II LLC, Atlanta, GA (US)

(*) Notice: Subject to any disclaimer, the term of this patent is extended or adjusted under 35 U.S.C. 154(b) by 99 days.

This patent is subject to a terminal disclaimer.

(21) Appl. No.: 18/179,512

(22) Filed: Mar. 7, 2023

(65) Prior Publication Data

US 2023/0209376 A1     Jun. 29, 2023

Related U.S. Application Data

(63) Continuation of application No. 17/219,266, filed on Mar. 31, 2021, now Pat. No. 11,627,480.

(51) Int. Cl.
*H04W 24/04*     (2009.01)
*H04W 24/02*     (2009.01)
*H04W 24/08*     (2009.01)

(52) U.S. Cl.
CPC ........... *H04W 24/04* (2013.01); *H04W 24/02* (2013.01); *H04W 24/08* (2013.01)

(58) Field of Classification Search
CPC ..... H04W 24/04; H04W 24/02; H04W 24/08; H04W 84/105; H04L 41/0663; H04L 41/0846; H04L 41/0895
See application file for complete search history.

(56) References Cited

U.S. PATENT DOCUMENTS

2021/0044498 A1*   2/2021   Mercian .............. H04L 41/5025

FOREIGN PATENT DOCUMENTS

WO     2021/004517 A1     1/2021

OTHER PUBLICATIONS

Non Final Office Action received for U.S. Appl. No. 17/219,266 dated Aug. 17, 2022, 99 pages.
(Continued)

*Primary Examiner* — Said M Elnoubi
(74) *Attorney, Agent, or Firm* — Guntin & Gust, PLC; Dana B. LeMoine

(57) ABSTRACT

Generating a core instance via a first access network device of a first access network, wherein the core instance facilitates operation of a second access network via a second access network device of the second access network is disclosed. Generally, implementing a core network can be highly resource intensive, e.g., high labor, equipment, and monetary costs. The level of resources that are conventionally committed in developing a core instance can be a significant barrier for many small or medium sized entities. The disclosed subject matter discloses a configuration component that can generate a core instance that can be performed at a remotely located access network. In an embodiment, a remotely implemented core instance can be updatable. Further, in response to a remotely implemented core instance failing to perform, a monitoring component can facilitate a failover operation.

20 Claims, 10 Drawing Sheets

(56) References Cited

OTHER PUBLICATIONS

Notice of Allowance received for U.S. Appl. No. 17/219,266 dated Dec. 8, 2022, 14 pages.

* cited by examiner

GENERATING A CORE INSTANCE AT A FIRST ACCESS NETWORK CORE CONFIGURATOR TO FACILITATE OPERATION OF A SECOND ACCESS NETWORK

RELATED APPLICATION

The subject patent application is a continuation of, and claims priority to, U.S. patent application Ser. No. 17/219,266, filed Mar. 31, 2021, and entitled "GENERATING A CORE INSTANCE AT A FIRST ACCESS NETWORK CORE CONFIGURATOR TO FACILITATE OPERATION OF A SECOND ACCESS NETWORK," the entirety of which priority application is hereby incorporated by reference herein.

TECHNICAL FIELD

The disclosed subject matter relates to generation of a 5G core, and more specifically to generation of an instance of a 5G core that can be deployed remotely from network equipment affiliated with a wireless network provider.

BACKGROUND

A fifth generation (5G) core network typically comprises network functions residing in virtual machines of a core network affiliated with a wireless network provider (WP). Implementing a core network has traditionally been labor intensive to build, cost intensive at all levels, requiring a great deal of maintenance and support, and, as such, has typically be the domain of national carrier level entities. Smaller entities typically do not operate a core wireless network outside a carrier core. In some exceptions, a smaller entity can lease space on a carrier core, can source a typically expensive private core via a vendor, or can build a private core by taking on the much the same level of expense and labor as a national carrier, albeit generally without the same resources as a national carrier. Conventionally a network core cost and labor can be similar regardless of the size of an operating entity, however a divide in the resources, e.g., cash, labor, expertise, between different operating entities has historically resulted in a majority of network core operations being relegated to large entities, e.g., national or large-regional wireless carriers, because smaller entities face similar barriers to entry into a network core but often have less access to resources to overcome these barriers. This is especially true at a residential entity level, e.g., a homeowner deploying a network core is expected to be exceedingly rare.

DETAILED DESCRIPTION

Figure 1:
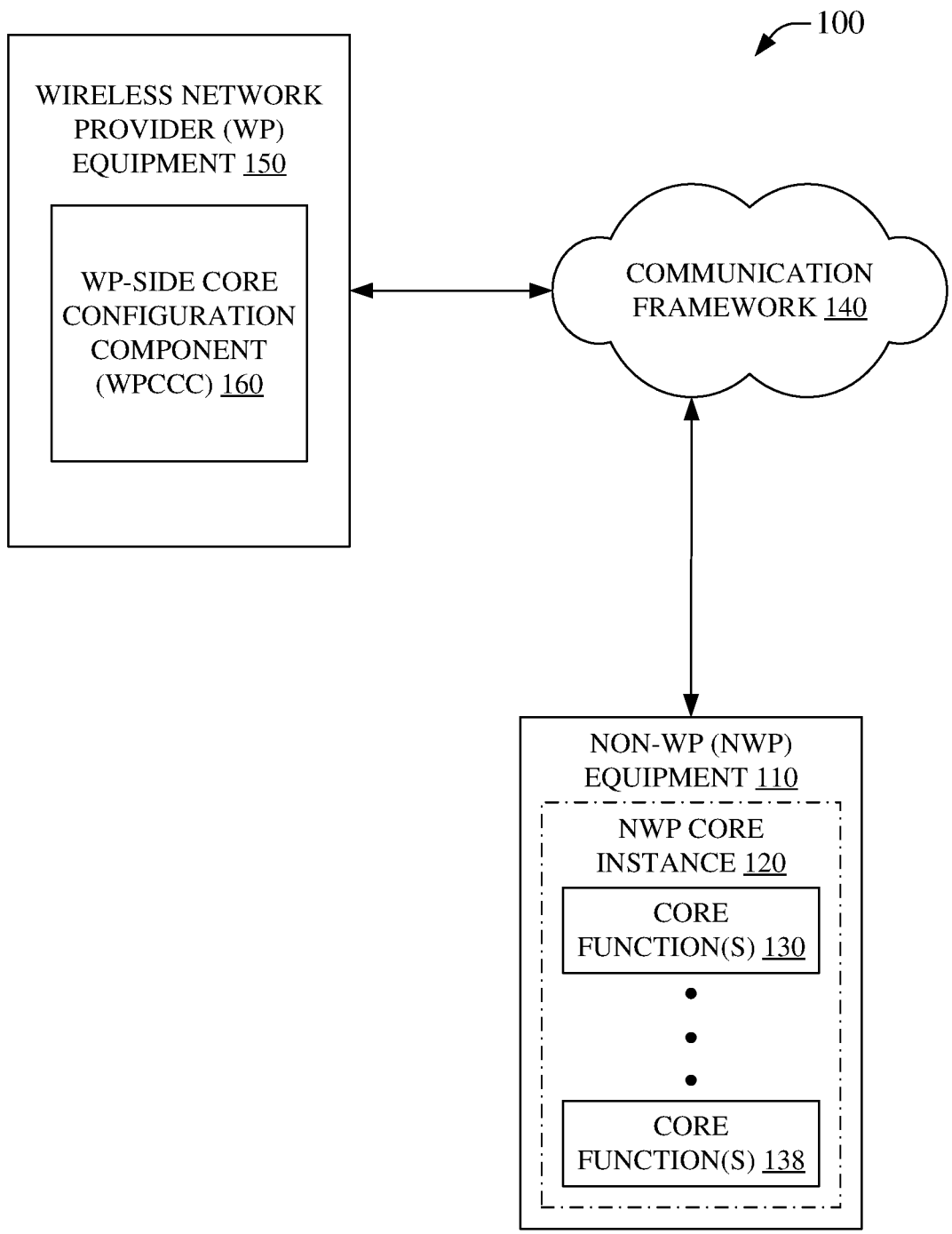
FIG. 1 is an illustration of an example system that can enable implementing a fifth-generation core network (5GC) on non-wireless provider (NWP) equipment via wireless provider (WP) equipment, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As such, the 5G core network (5GC) is typically implemented by and for a wireless network provider (WP), e.g., a national carrier entity, a large regional carrier entity, etc., as is distinct, at least in scale, from a smaller local wireless provider for a corporate campus, school, or residence, e.g., a 'non-wireless network provider' (NWP). This distinction can often correspond to different goals, for example, a corporate campus level provider as a NWP can seek to serve comparatively fewer UEs than a WP but can seek to provide highly tailored network slices under high levels of security in comparison to the WP in this example. Accordingly, a 5GC for a WP in this example can differ substantially from a 5GC for the example NWP. Generally, where an entity other than a carrier opts to implement their own 5GC core functions, significant capital will be invested in designing, building out, and maintaining the corresponding virtual network elements, for example, a non-wireless network provider (NWP) can elect to employ a free citizen band radio service (CBRS) network and implement their own localized RAN. However, in this example, the NWP can end up investing significant resources to implement their own 5GC or lease a 5GC from a vendor. Moreover, in this example, if the NWP chooses not to implement their own 5GC core network or acquire one from a vendor, then the NWP can choose to use a 5GC of a WP, which can result in loss of control over the 5GC, and additionally, fees for services would typically be billed by the WP.

In a 5G core network (5GC), network functions can include elements supporting access mobility (AMF), session management (SMF), security, e.g., authentication server function (AUSF), unified data management function (UDM), application function (AF), etc., policy control function (PCF), among many other functions. Generally, a modern network function can reside in a virtual machine, e.g., can operate within the virtual machine environment. In turn, a modern virtual machine can reside in a software container, typically an orchestrated software container such as KUBERNETES, etc., and can be customized by a WP, carrier, NWP, etc. It is common for 5GCs to reside in facilities that serve regions, for example, national technical centers, local regional centers, etc., that can typically be larger than might be served by an enterprise, residence, or other NWP. As an example, a national carrier, such as AT&T, can operate a 5G core that can be expected to serve a much larger area than another 5G core than might be implemented by John Q. Doe of Cheyenne, Wyoming to provide 5G services to Mr. Doe's ranch employees while out managing livestock. However, in this example, it can readily be appreciated that it can be challenging for Mr. Doe to implement the illustrated 5GC on his own, expensive to purchase a 5GC from a vendor, and impractical to connect to a 5GC of a WP.

As is noted elsewhere herein, a 5GC can typically comprise a network function residing in a virtual machine affiliated with a wireless network provider (WP) that can generally be of a substantially different scale than a non-wireless network provider (NWP) and, as such, a 5G core of a WP environment (WP 5GC) can typically be configured distinctly differently than another 5G core supporting a NWP environment (NWP 5GC). As an example, a WP can be a national carrier, a large regional carrier, etc., and can be associated with providing service to a broad spectrum of user equipment via a large scale 5G core(s). As an example, public consumer user equipment, corporate user equipment, internet-of-things (IOP) devices, smart vehicles, mobile virtual network operator MVNO equipment, etc., can all be supported via a national carrier's wireless network 5G core(s). Accordingly, a 5G core of a WP can be substantially different from a 5G core of a NWP, e.g., an NWP can be comparatively smaller/narrower in service scope and their 5G core(s) can be tailored to that smaller/narrower nature. As an example, a corporation can deploy a radio access network (RAN) at a corporate facility and can deploy an NWP 5G core to support use of the NWP RAN. In this example, the expected traffic can be restricted to authorized devices, e.g., authentication of devices can be corporate-centric, and within certain geographic regions. Further in this example, there can typically be fewer devices accessing the NWP 5G core than might be accessing a similar WP 5G core because the NWP would typically be serving only a fraction of the UEs in an area, e.g., where there are 10,000 UEs in an area, perhaps only 1,500 of those UEs would be authorized to access the NWP RAN, such as supporting 500 corporate devices and 1,000 employee devices while rejecting service of other UEs that could belong to vendors, passersby/general public, transit employees, ride-share drivers, employees of other businesses in abutting facilities, etc.

A NWP 5GC can be implemented outside of a WP 5GC, but typically this can entail investing significant capital in designing, building out, and maintaining the corresponding virtual network elements/functions. As an example, a NWP can elect to employ a citizen band radio service (CBRS) network and implement their own localized RAN, then end up investing significant resources to develop and implement their own 5GC. An alternative for a NWP is to lease a 5GC from a vendor, however, while the leased vendor core can be tailored to the NWP, the costs can be substantial as well. In an embodiment of the disclosed subject matter where the NWP is deployed by a homeowner for their personal residence, purchasing/leasing a vendor provided 5G core can be out of reach due to cost and complexity. Where the example NWP chooses not to implement their own 5GC core network or acquire one from a vendor, then the NWP can choose to use a WP 5GC, however this can result in loss of control over the 5GC, and additionally, fees for services would typically be billed by the WP. The loss of control can be problematic for many NWPs, for example, a corporate NWP can have authorization rules that can be difficult or impractical to support via a WP 5GC. As such, there exists a middle ground between relying on a WP 5GC and conventional mechanisms of attaining a NWP 5GC via a vendor or NWP development. In this regard, a novel WP configuration component can generate, typically in an automated or semi-automated manner, a NWP 5GC instance. The NWP 5GC instance can be germane to interoperation with the WP 5GC. Moreover, in an embodiment, the WP configuration component can provide ongoing support for the NWP 5GC instance. In some embodiments, this support can comprise, for example, failover protection, support of control plane and user plane separation (CUPS) network topography, performance optimization, implementing customer originated updates to a NWP 5GC function, e.g., changes to authentication methods, available customer resources, etc., among nearly any other form of ongoing 5GC maintenance.

A 5GC, network can perform a virtualized function(s). As core networks have evolved, the trend has been to move from dedicated specialized hardware that would typically become outdated rapidly and thereby increase expense and decrease aa rate at which a carrier would improve their network, e.g., even where newer technology existed it might not be implemented due to constant upgrade costs and interoperability with other network components, to virtualized functions that can be implemented on commercial off the shelf hardware (COTS). To be sure, COTS are transformed into specialized and non-generic computer equipment by performing the virtualized functions for a 5GC. As an example, a server blade executing a virtual session management function is not generic in nature even if the blade itself may be generic, e.g., the execution of the virtual function transforms the blade into a very non-generic computer equipment. Virtualized 5GC functions can include elements supporting access mobility (AMF), session management (SMF), security, e.g., authentication server function (AUSF), unified data management function (UDM), application function (AF), etc., policy control function (PCF), among many other functions. Whereas a modern network function can reside in a virtual machine, e.g., can operate within the virtual machine environment, the modern virtual machine can, in some embodiments, reside in a software container, typically an orchestrated software container such as KUBERNETES, etc. Each of the network function, virtual machine, and software container can be customizable, e.g., by a WP, carrier, NWP, etc. In an example, it is common for WP 5GCs to reside in facilities that serve regions, for example, national technical centers, local regional centers, etc., that can typically be larger than might be served by an enterprise, residence, or other NWP. Repeating an earlier example, a national carrier, such as AT&T, can operate a WP 5G core that can be expected to serve a much larger area than another NWP 5G core than might be implemented by John Q. Doe of Cheyenne, Wyoming to provide 5G services to Mr. Doe's ranch employees while out managing livestock. As before in this example, it can readily be appreciated that it can be challenging for Mr. Doe to implement the illustrated NWP 5GC on his own, expensive to purchase a NWP 5GC from a vendor, and impractical to connect to a WP 5GC. Accordingly, employing a WP-side core configuration component (WPCCC) to implement a NWP core instance can provide a NWP-side core that can be compatible with a WP core, is maintainable, can be affordable, can be tailored to the NWP environment, etc., e.g., an AT&T-side WPCCC can implement a NWP 5GC at a NWP-side equipment, for example on a server in John Q. Doe's home office.

The disclosed subject matter allows for wireless network provider (WP) equipment to develop, implement, deploy, support, etc., one or more instances of non-wireless network provider (NWP) core instances, typically on NWP-side equipment. It is noted that a NWP typically does provide wireless network access in a much more limited or constrained manner than a WP, as such, the term NWP is not intended to indicate that the NWP does not at all provide access to a wireless network, but rather to indicate that the NWP is fundamentally different than a WP under normal conventions, e.g., much as a HAM radio operator is distinct from a national broadcast radio entity, a NWP is also distinct from a WP. As such, a distinguishing characteristic between a NWP 5GC and a WP 5GC can be that a NWP 5GC can be designed to serve, for example, one or more orders of magnitude fewer UEs than a WP 5GC. As an alternate distinguishing characteristic, a NWP 5GC can generally be available to a UEs meeting designated criteria that would typically exclude the general public, for example, a WP 5GC might typically serve any UE passing through an associated example service area while a NWP 5GC can typically reject serving the same UE passing through the example service area. It is noted that the present disclosure generally discusses 5G core instances although the disclosure can similarly apply to any generation of wireless technology and, as such, is equally applicable to $6^{th}$ generation cores and beyond without departing form the scope of this instant disclosure.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate implementing a fifth-generation core network (5GC) on a non-wireless provider (NWP) equipment via a wireless provider (WP) equipment, in accordance with aspects of the subject disclosure. System 100 can comprise NWP equipment 110 communicatively coupled to WP equipment 150 via communication framework 140. As an example of this arrangement, a corporate campus can comprise a corporate server that can represent NWP equipment 110. The corporate server can communicate with equipment of a national wireless carrier, for example, AT&T wireless, wherein this equipment can represent WP equipment 150. The communication in this example can occur over wired or wireless links, for example, via one or more of copper telephone lines, fiber optic cables, radio links, etc., and can be represented by communication framework 140. This example can be referred to in a rudimentary manner as the example corporate server being connected to the carrier equipment.

In an embodiment of the disclosed subject matter, NWP equipment 110 can execute NWP core instance 120. NWP core instance 120 can be a NWP 5G core. NWP core instance 120 can support one or more core function(s) 130, . . . , 138, etc. As such, NWP core instance 120 can support core functionality for a network corresponding to NWP equipment 110, e.g., as has been noted elsewhere herein, NWP is typically of a different scale or scope of service than a WP and NWP employs a core to support a NWP network even where counter intuitive in view of the term 'non-wireless provider' because the term NWP is intended to illustrate that the network of the NWP is of a different scale or scope of service than that traditionally associated with a WP, e.g., a national or large-region wireless network/cellular provider. In this manner, a NWP core network can be tailored to support of fewer UEs, UEs that satisfy rules related to distinguishing between a NWP and a WP, etc., in contrast to a WP core network that can generally be associated with serving larger and more diverse UEs, e.g., national or large-regional carriers.

WP equipment 150 of system 100 can comprise WP-side core configuration component (WPCCC) 160 that can configure NWP core instance 120 via communication framework 140. In this manner, system 100 can illustrate that WPCCC 160 can determine what virtualized functions to include in NWP core instance 120. Moreover, WPCCC 160 can configure selected virtualized functions that are included in NWP core instance 120. As an example, WPCCC 160 can select an access mobility function (AMF) to be included in NWP core instance 120, configure an AMF to be included in NWP core instance 120, or both select and configure the example AMF. Other examples can include WPCCC 160 selecting and/or configuring other core functions for inclusion in NWP core instance 120, e.g., a session management function (SMF), a security function, e.g., an authentication server function (AUSF), a unified data management function (UDM), an application function (AF), etc., a policy control function (PCF), or nearly any other function. These selected/configured virtualized functions can be implemented as one or more of core functions(s) 130 to 138, etc.

In example embodiments of system 100, WPCCC 160 can receive information corresponding to an environment of the NWP, e.g., predicted scope of service to be provided, type(s) of equipment comprising at least a part of the NWP network, for example, a processor expected to execute NWP core instance 120, designated security/authentication parameters, types of data expected to be managed by NWP core instance 120, etc. This environmental information can be gathered by WPCCC 160 via direct interrogation/sensors, e.g., from NWP equipment 110 via communication framework 140, etc., can be provided to WPCCC 160 by the NWP, e.g., via a provided configuration file, etc., can be determined via an automated interaction such as a NWP customer interacting with a software wizard, etc. In embodiments, default values can be employed in a default NWP core plan, which default values can be updated by gathered NWP environment information in an updated NWP core plan. The default, or preferably, the updated NWP core plan can be employed to generate NWP core instance 120 for execution at NWP equipment 110. The generated NWP core instance, in an embodiment, can be generated on the WP-side and then communicated to the NWP side for execution on NWP equipment 110. In other embodiments, instructions for generating the NWP core instance can be communicated to NWP equipment 110 which can then generate and execute NWP core instance 120 locally.

In embodiments of system 100, one or more of WPCCC 160 can support generating one or more of NWP core instance 120 in one or more NWP equipment 110, for one or more NWP. As an example, WPCCC 160 can enable execution or NWP core instance 120 as illustrated in FIG. 1, e.g., NWP core instance 120 is determined by WPCCC 160 based on the NWP environment and then performed on NWP equipment 110. In another embodiment of system 100, WPCCC 160 can enable execution NWP core instances for two or more example NWPs, correspondingly on NWP equipment of each example NWP, e.g., WPCCC 160 can determine a first NWP core instance for a military base in Wyoming and a second NWP core instance for a second military base in Germany, wherein the first NWP core instance can be based on the Wyoming base environment and can be deployed on the Wyoming base NWP equipment, and the second NWP core can be based on the German base environment and deployed on NWP equipment of the German base. As such, WPCCC 160 can support deployment of one or more NWP core instances.

Figure 2:
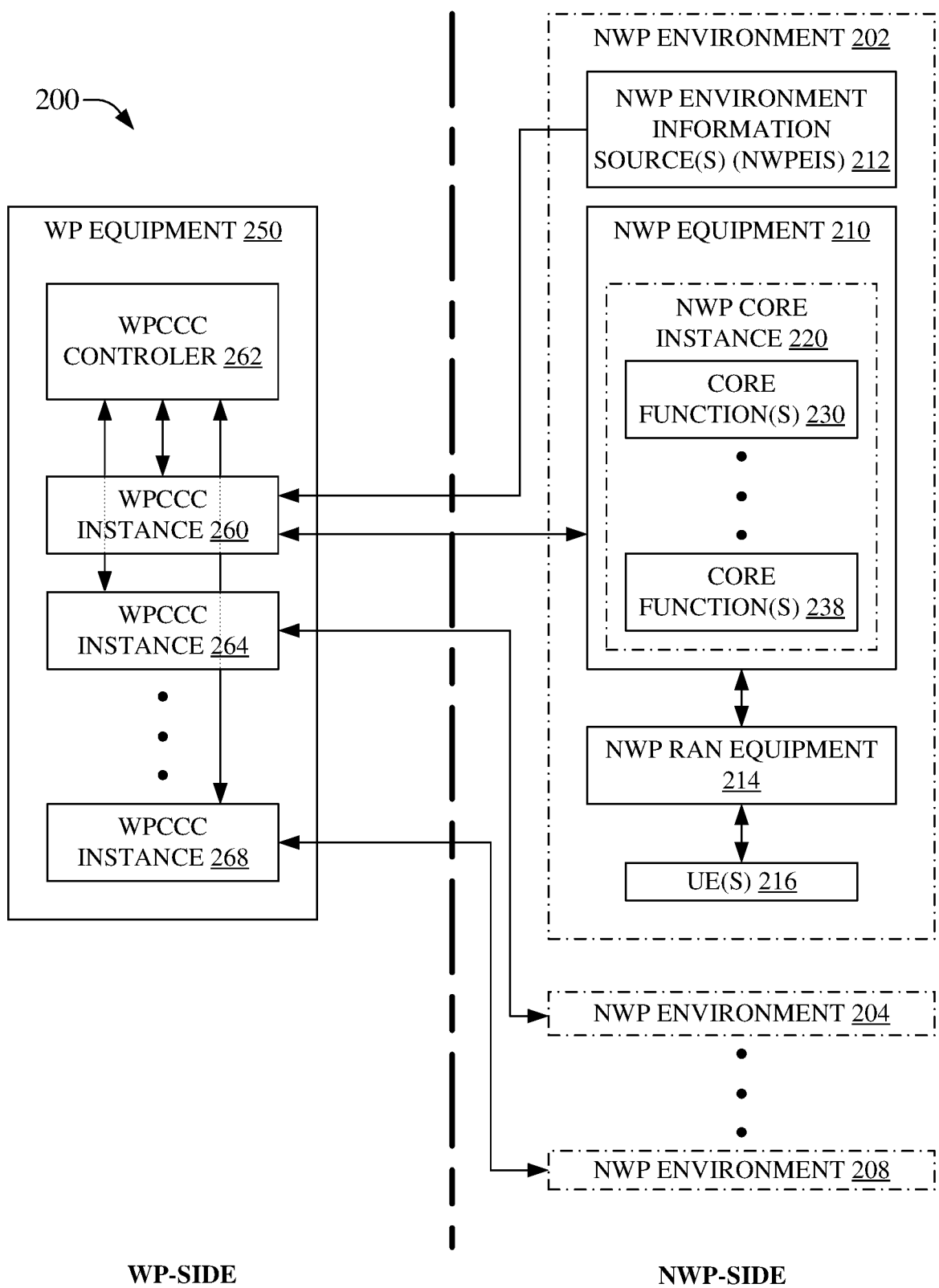
FIG. 2 is an illustration of an example system that can facilitate configuring a 5GC on a NWP equipment via a configurator component operating on a WP equipment, in accordance with aspects of the subject disclosure.

FIG. 2 is an illustration of a system 200, which can enable configuring a 5GC on a NWP equipment via a configurator component operating on a WP equipment, in accordance with aspects of the subject disclosure. System 200 can comprise NWP equipment 210 communicatively coupled to WPCCC instance 260 via WP equipment 250 and a communication framework that is not illustrated for clarity. FIG. 2 illustrates a WP-side and a NWP-side separated by a heavy dashed line, wherein communication between the two sides is understood to be via a communication framework, e.g., communication framework 140, etc. As is illustrated in system 200, a WPCCC instance, e.g., WPCCC 260, 264, 268, etc., can be controlled, managed, etc., via WPCCC controller 262. Whereas an instance of a WPCCC can be, for example, the same as or similar to WPCCC 160, WPCCC controller 262 can serve to coordinate operation of the illustrated one or more WPCCC instances. In an embodiment, a WPCCC instance, e.g., 260, 264, 268, etc., can enable determining and deploying a NWP core instance, e.g., 220, etc.

WP equipment 250 can be comprised in a WP core network and can support one or more WPCCC controller 262 that can in turn support one or more WPCCC instance 260, 264, 268, etc. As an example, a national carrier core network can comprise a WPCCC controller 262 that can manage a WP-side WPCCC instance corresponding to Oregon, two a WP-side WPCCC instances corresponding to California, another a WP-side WPCCC instance corresponding to Texas, etc. These example WPCCC instances can then enable deploying NWP core instances regionally, e.g., in the Pacific Northwest area via the Oregon WPCCC instance executing on WP equipment 250, in the Southwest via the Texas WPCCC instance executing on WP equipment 250, in Silicon Valley via one of the California WPCCC instances executing on WP equipment 250, etc.

A WPCCC instance, e.g., WPCCC instance 260, 264, 268, etc., can receive NWP environment information via NWP environment information source(s) (NWPEIS) 212. NWPEIS 212 can enable interrogation of NWP environment 202 by WPCCC instance 260 or can source determined environmental information for WPCCC instance 260. NWP environment 204, 208, etc., can similarly comprise a NWPEIS that can source corresponding environment information to WPCCC instance 264, 268, etc. NWP environment information can enable selecting and configuring, via WPCCC instance 260 that is managed by WPCCC controller 262, one or more of core function(s) 230 to 238 of NWP core instance 220 executing at NWP equipment 210 of NWP environment 202. Similarly, core functions in NWP cores of NWP environments 204, 208, etc., can be supported via corresponding WPCCC instances, e.g., WPCCC instance 264, 268, etc. As such, system 200 can illustrate a WPCCC instance executing on the WP-side of a communication framework to gather information relevant to a NWP environment to enable determining, deploying, and supporting a NWP core instance executing on a NWP-side equipment, e.g., NWP equipment 210. Returning to a previous example, a corporate campus can comprise a corporate server that can represent NWP equipment 210. The corporate server can communicate with equipment of a national wireless carrier, for example, AT&T wireless, wherein this equipment can represent WP equipment 250. The communication in this example can occur over wired or wireless links, for example, via one or more of copper telephone lines, fiber optic cables, radio links, etc. The communication can enable access to NWPEIS 212. The communication can enable deploying NWP core instance 220 by NWP equipment 210, wherein NWP core instance 220 is determined at WP equipment 250 via WPCCC 260.

NWP equipment 210 can execute NWP core instance 220. NWP core instance 220 can be a NWP 5G core. NWP core instance 220 can support one or more core function(s) 230, . . . , 238, etc. As such, NWP core instance 220 can support core functionality for a network corresponding to NWP equipment 210. WPCCC 260, 264, 268, etc., can each configure a NWP core instance, e.g., 220, etc., via communication across a boundary between the WP-side and the NWP-side as is illustrated in FIG. 2, e.g., via communication framework 140, etc. As an example, WPCCC 260 can determine what virtualized functions to include in NWP core instance 220. Moreover, example WPCCC 260 can configure selected virtualized functions that are included in NWP core instance 220, such as selecting an access mobility function (AMF) to be included in NWP core instance 220, configure an AMF to be included in NWP core instance 220, or both selecting and configuring the example AMF. Other examples can include WPCCC 260 selecting and/or configuring other core functions for inclusion in NWP core instance 220, e.g., a session management function (SMF), a security function, e.g., an authentication server function (AUSF), a unified data management function (UDM), an application function (AF), etc., a policy control function (PCF), or nearly any other function. These selected/configured virtualized functions can be implemented as one or more of core functions(s) 230 to 238, etc.

System 200 can gather information corresponding to NWP environment 202, 204, 208, etc., e.g., via NWPEIS 212. NWP environment information, for example, can correspond to a predicted scope of service to be provided, type(s) of equipment comprising at least a part of the NWP network, for example, a processor expected to execute a NWP core instance, designated security/authentication parameters, types of data expected to be managed by a NWP core instance, etc. This environmental information can be gathered via direct interrogation/sensors, can be provided by an entity on behalf of the NWP, can be determined via an automated interaction, etc., and can be sourced via NWPEIS 212, etc. As is previously noted, in an embodiment, default values can be employed in a default NWP core plan, which default values can be updated in an updated NWP core plan. NWP core instance 220 can therefore be based on NWPEIS 212 gathered environment information communicated to WPCCC 260. The resulting NWP core instance 220 can then be executed at NWP equipment 210. The generated NWP core instance is illustrated as being generated based on a WP-side WPCCC instance, e.g., WPCCC 260. In other embodiments illustrated elsewhere herein, the WPCCC instance can be operating on the NWP-side based on management via WPCCC controller 262 on the WP-side.

Figure 3:
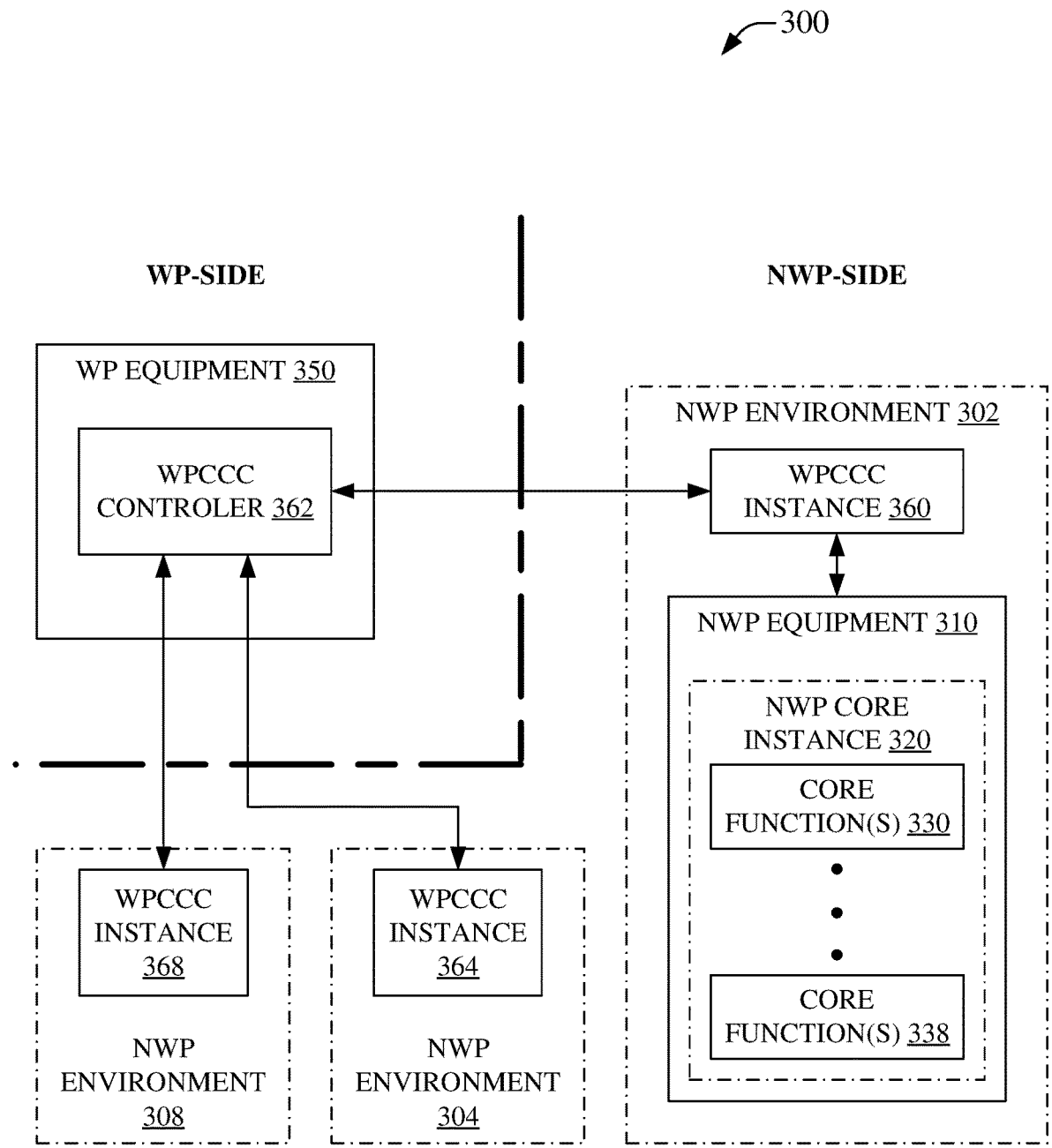
FIG. 3 is an illustration of an example system that can enable configuring a 5GC on a first NWP equipment via a configurator component instance operating on a second NWP equipment, in accordance with aspects of the subject disclosure.

FIG. 3 is an illustration of a system 300 that can facilitate configuring a 5GC on a first NWP equipment via a configurator component instance operating on a second NWP equipment, in accordance with aspects of the subject disclosure. System 300 can comprise NWP equipment 310 communicatively coupled to WPCCC instance 360 within NWP environment 302. In an embodiment, WPCCC instance 360 can be executing on equipment of NWP environment 302, for example, NWP equipment 310 can perform WPCCC instance 360. In another example, other equipment of NWP environment 302 can perform WPCCC instance 360. WPCCC instance 360, being performed on the NWP-side, can be communicatively coupled to WPCCC controller 362, for example, performing on WP equipment 350 on the WP-side of a communication framework, e.g., communication framework 140, etc. In the illustrated embodiment, WPCCC controller 362 can manage a WPCCC instance being performed via equipment other than WP equipment 350. Accordingly, WPCCC controller 362 can manage a WPCCC instance being performed on each of NWP environments 302, 304, 308, etc., e.g., correspondingly WPCCC instance 360, 364, 368, etc.

System 300 can be contrasted with system 200 in which WPCCC instances, e.g., 260, 264, 268, etc., can be performed under control of the WPCCC controller 262, on the WP-side of a communication framework. However, illustrated system 300 can advantageously distribute consumption of some computing resources to equipment of a NWP, e.g., by managing a WPCCC instance being performed at NWP environment equipment. This can serve to offload consumption of resources by the WP-side equipment, for example, as illustrated in system 200. As an example, where 100 WPCCC instances are performed at WP-equipment 250, all of the management and execution costs can be borne by WP equipment 250, while in contrast, according to system 300, a similar condition can see the management costs borne by WP equipment 350 but the execution costs being borne by NWP environment equipment. As such, system 300 can illustrate more centralized management of distributed WPCCC instances that can determine NWP core instances for execution in NWP environments. This topology can also serve to reduce communicating environmental information between the NWP-side and the WP-side in that the WPCCC instance, in system 300, e.g., WPCCC instance 360, etc., is local to NWP environment 302 and also local to NWP equipment 310 that can perform NWP core instance 320 as determined by local WPCCC instance 360 albeit that WPCCC instance is managed via WPCCC controller 362 from the WP-side via WP equipment 362.

The WP-side and a NWP-side of system 300, the sides separated by a heavy dashed line, can communicate via an unillustrated communication framework, e.g., communication framework 140, etc. As is illustrated in system 300, a WPCCC instance, e.g., WPCCC 360, 364, 368, etc., can be controlled, managed, etc., via WPCCC controller 362. This can be similar to system 200, except that in system 300 the managed WPCCC instances can be operating remotely from managing WPCCC controller 362. As before, WPCCC controller 362 can serve to coordinate operation of the illustrated one or more WPCCC instances. In an embodiment, a WPCCC instance, e.g., 360, 364, 368, etc., can enable determining and deploying a NWP core instance, e.g., 320, etc., at a NWP equipment of a corresponding NWP environment.

WP equipment 350 can be comprised in a WP core network and can support one or more WPCCC controller 362 that can in turn support one or more remotely located WPCCC instances 360, 364, 368, etc. Returning to a previously employed example, a national carrier core network can comprise a WPCCC controller 362 that can manage a WPCCC instance executing in Oregon, two WPCCC instances executing in California, another WPCCC instance executing in Texas, etc. These example WPCCC instances can then enable deploying NWP core instances regionally, e.g., in the Pacific Northwest area via the Oregon WPCCC instance executing on NWP equipment for the Oregon region, in the Southwest via the Texas WPCCC instance executing on NWP equipment for the Texas region, in Silicon Valley via one of the California WPCCC instances executing on NWP equipment for the California region, etc.

Figure 4:
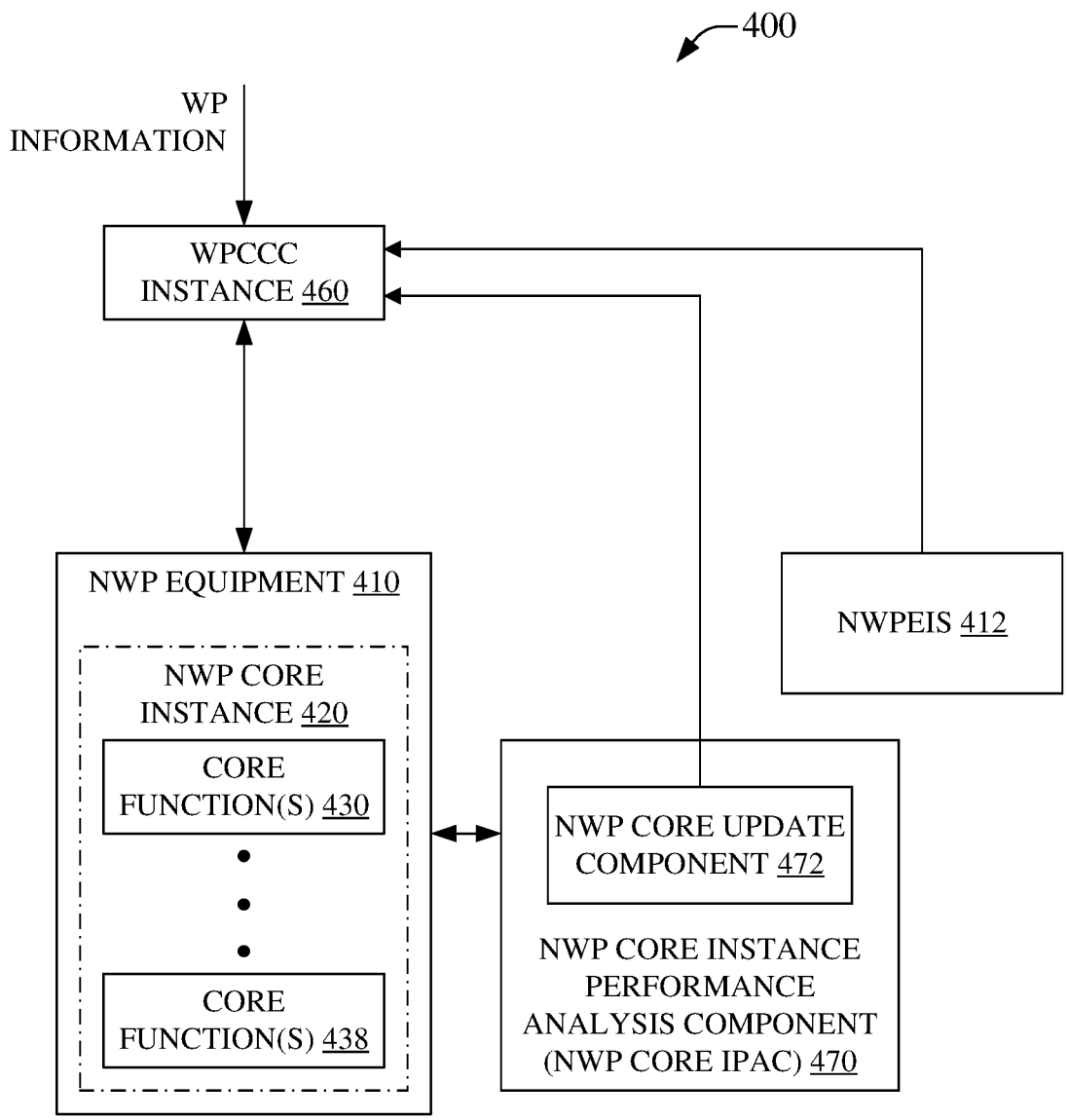
FIG. 4 illustrates an example system that can facilitate updating a configuration of a 5GC on a NWP equipment via a configurator component, in accordance with aspects of the subject disclosure.

FIG. 4 is an illustration of a system 400, which can enable updating a configuration of a 5GC on a NWP equipment via a configurator component, in accordance with aspects of the subject disclosure. System 400 can comprise NWP equipment 410 communicatively coupled to WPCCC instance 460. In an embodiment, WPCCC instance 460 can be executed on WP-side equipment or on NWP-side equipment. WPCCC instance 460 can be managed and controlled by a WPCCC controller, e.g., controller 262, 362, etc., and can receive WP information via this WPCCC controller.

NWP equipment 410 can perform NWP core instance 420. NWP core instance 420 can comprise core function(s) 430, to 438, etc. In an embodiment, a WPCCC instance, e.g., 460, can have determined NWP core instance 420, facilitated NWP equipment 410 performing NWP core instance 420, or combinations thereof. In some embodiments, NWP core instance 420 can have been determined and/or implemented via another WPCCC instance other than WPCCC instance 460. The performance of NWP core instance 420 can be analyzed via NWP core instance performance analysis component (NWP core IPAC) 470. In an embodiment, NWP core IPAC 470 can enable determining that NWP core instance 420 is performing as designed, e.g., as a NWP environment can evolve in time, NWP core IPAC 470 can determine that the NWP core instance is operating within designated parameters. As an example, where NWP core instance 420 was configured to interact with 100 IOT devices for a small NWP company, but the small NWP company undergoes an automation upgrade that adds several thousand new IOT devices to their production line, NWP core instance 420 can be drastically underperforming by trying to support nearly 10× the number of IOT devices it was originally implemented for. Accordingly, in this example, NWP core IPAC 470 can determine that NWP core instance 420 is not performing as designed and can signal, via NWP core update component 472, WPCCC instance 460 to update NWP core instance 420.

WPCCC instance 460 can receive an indication from NWP core update component 472 that can trigger updating of a NWP core instance, e.g., NWP core instance 420. WPCCC instance 460 can receive NWP environment information, as previously disclosed, e.g., via NWPEIS 412. WPCCC instance 460 can then accordingly update or replace NWP core instance 420. In this regard, WPCCC instance 460 can act to both initially determine a NWP core instance and can further operate to maintain a deployed NWP core instance, e.g., NWP core instance 420 can be maintained by WPCCC instance 460. In some embodiments, NWP core IPAC 470, NWP core update component 472, or combinations thereof, can be performed via NWP equipment 410, e.g., as components executing on NWP equipment 410, as components comprised in NWP core instance 420 executing on NWP equipment 410, etc. In some embodiments, NWP core IPAC 470, NWP core update component 472, or combinations thereof, can be performed via other equipment, which other equipment can be performing NWP-side or performing WP-side.

Figure 5:
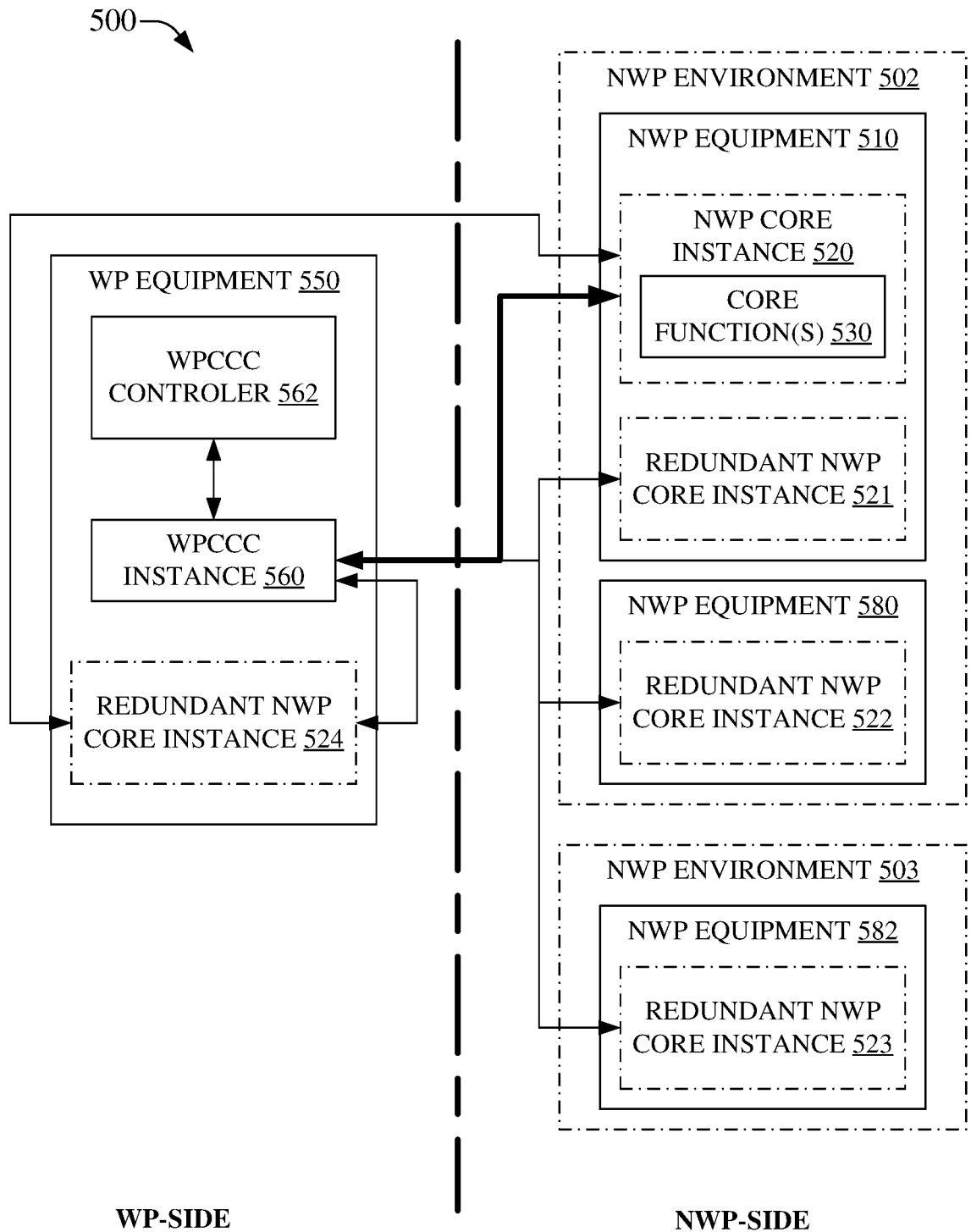
FIG. 5 is an illustration of an example system enabling failover from a first 5GC on a NWP equipment to a second 5GC, in accordance with aspects of the subject disclosure.

FIG. 5 is an illustration of an example system 500 that can facilitate failover from a first 5GC on a NWP equipment to a second 5GC, in accordance with aspects of the subject disclosure. System 500 can comprise NWP equipment 510 communicatively coupled to WPCCC instance 560. In an embodiment, WPCCC instance 560 can be executed on WP-side equipment or on NWP-side equipment. WPCCC instance 560 can be managed and controlled by a WPCCC controller, e.g., controller 262, 362, etc., and can receive WP information via this WPCCC controller. NWP equipment 510 of NWP environment 502, wherein NWP equipment 510 can perform NWP core instance 520 comprising core function(s) 530. In an embodiment, WPCCC instance 560 can support NWP core instance 520, e.g., can have participated in determining NWP core instance 520, implementing NWP core instance 520, updating NWP core instance 520, maintaining NWP core instance 520, etc. WPCCC instance 560 can execute WP-side, e.g., via WP equipment 550 and under control of WPCCC controller 562, in an embodiment illustrated for system 500. In other embodiments, as disclosed elsewhere herein, WPCCC instance 560 can execute other than WP-side.

It is foreseeable that NWP core instance 520 can fail or underperform to such a level as to be regarded as failed. In an embodiment, attempts can be made to update NWP core instance 520 to recover from a failure. However, updating NWP core instance 520 can, in some instances, be slower than desired, e.g., resulting in the NWP network not operating satisfactorily during recovery. Accordingly, system 500 can provide for failover mechanisms for NWP core instance 520. Whereas WPCCC instance 560 can determine, update, maintain, etc., a NWP core instance, WPCCC instance 560 can similarly generate replica core instances that can be employed as failover cores where NWP core instance 520 can fail.

In an embodiment, a redundant NWP core instance, e.g., 521, 522, 523, 524, etc., can be a replica of NWP core instance 520. In some embodiments, one or more of the redundant NWP core instances can be stored at alternate hardware locations. In some embodiments, one or more of the redundant NWP core instances can be executed in a shadow-mode, e.g., the redundant NWP core instance can act as if it is NWP core instance 520 but not actually control the core. In this manner, switching to the redundant NWP core instance can be already operating and transition can be more seamless than needing to first load a saved instance before switching.

Redundant NWP core instance 521 is illustrated as being located at NWP equipment 510, which can provide for fast failover response but can fail to be effective where the failover is necessitated by failure of NWP equipment 510 itself. Redundant NWP core instance 522 is illustrated as being located at NWP equipment 580, which can be distinct from NWP equipment 510 but can still be within NWP environment 502. As such, redundant NWP core instance 522 can support failover recovery from a failure of NWP equipment 510 but can fail to provide adequate protection where the failure of NWP core instance 520 results from damage to NWP environment 502. Accordingly, redundant NWP core instance 523 can be located at NWP equipment 582 of separate NWP environment 503, which can protect up to failures of several NWP environments. In a further example, redundant NWP core instance 524 can be located at the WP-side rather than at the NWP-side. This can be highly robust but can consume WP resources and would typically be associated with extra cost. Depending on NWP client demand, one or more of redundant NWP core instances 521-524 can be selected to enable failover from a failing/failing NWP core instance 520. Maintenance of a redundant NWP core instance can also be readily accomplished via the disclosed components, e.g., a WPCCC can update a redundant NWP core instance(s) as part of maintaining a NWP core instance.

Figure 6:
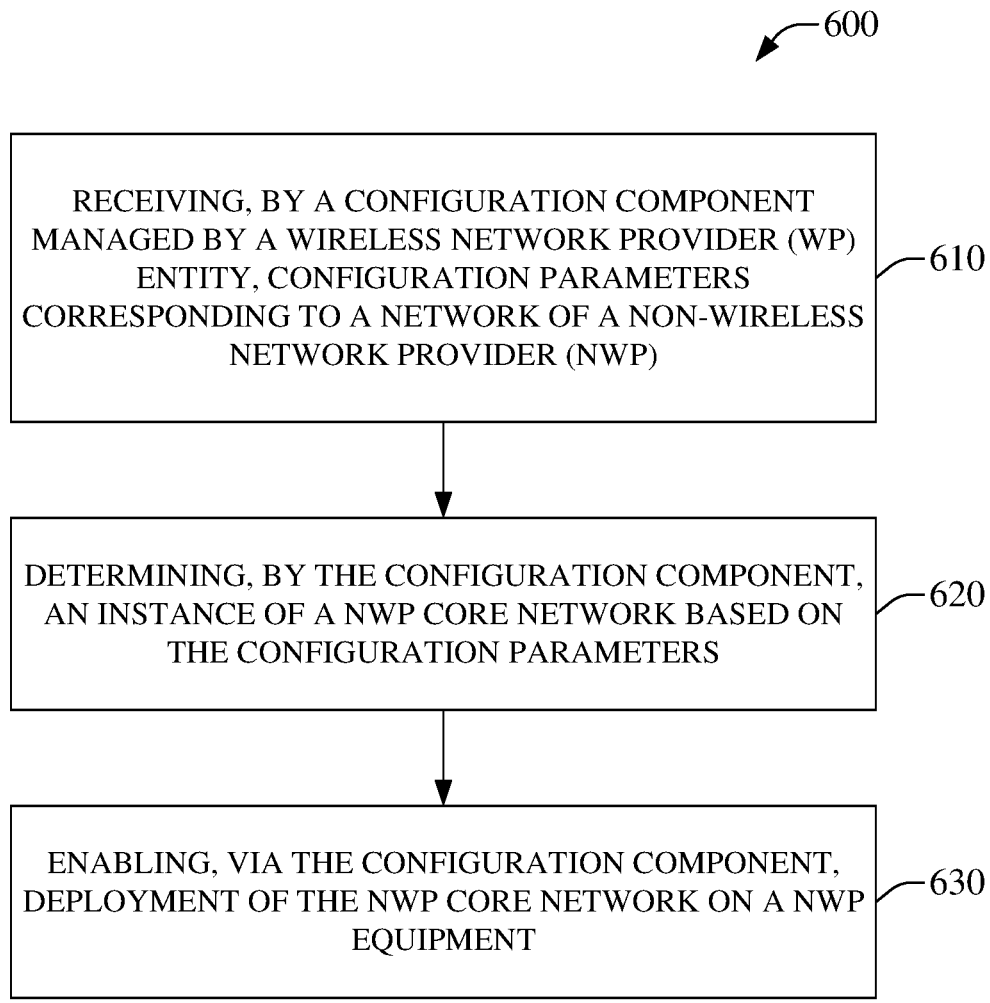
FIG. 6 is an illustration of an example method enabling WP equipment to facilitate implementation of a core network at NWP equipment, in accordance with aspects of the subject disclosure.
Figure 7:
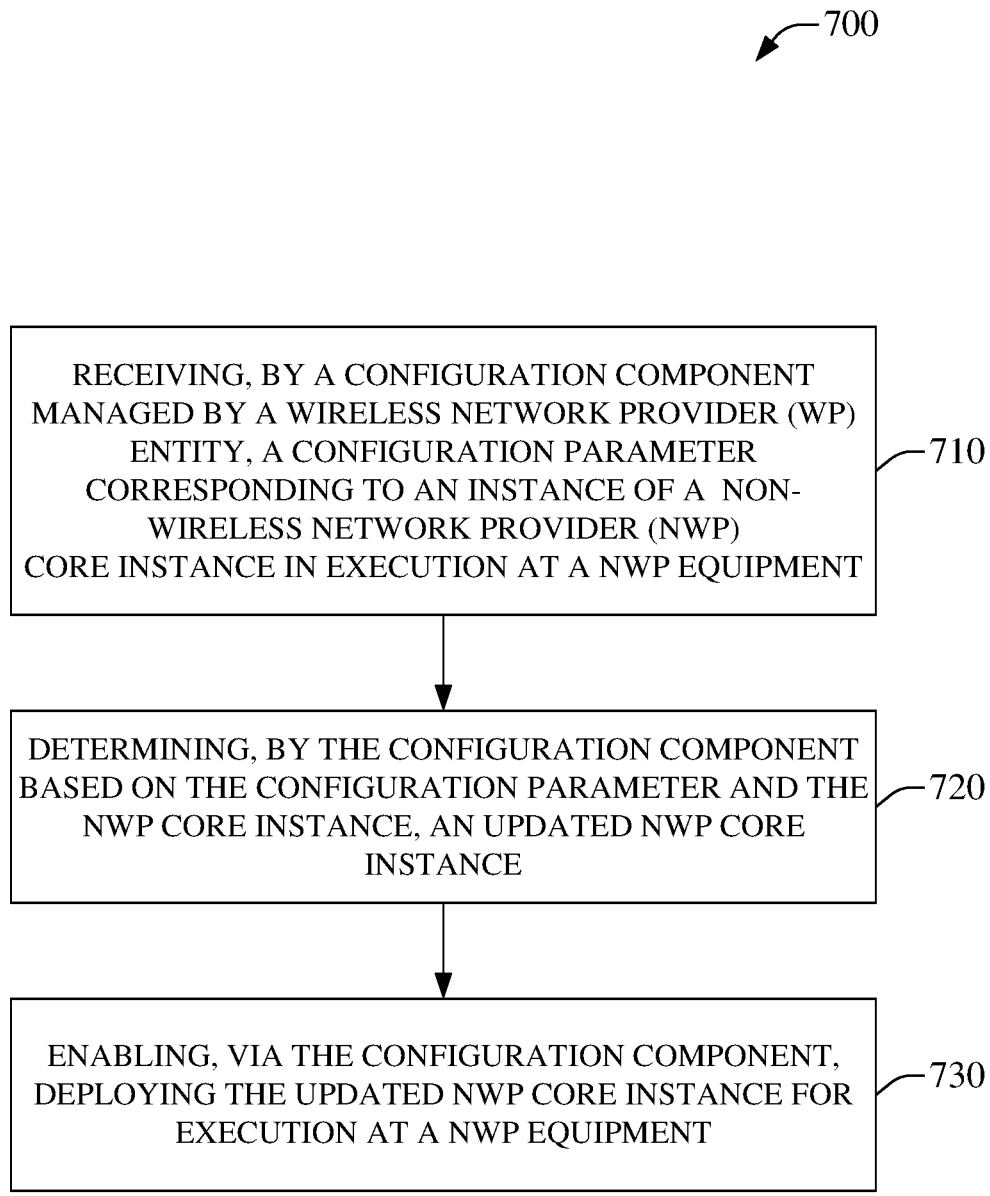
FIG. 7 illustrates an example method facilitating, via WP equipment, updating of a core network executing on NWP equipment, in accordance with aspects of the subject disclosure.
Figure 8:
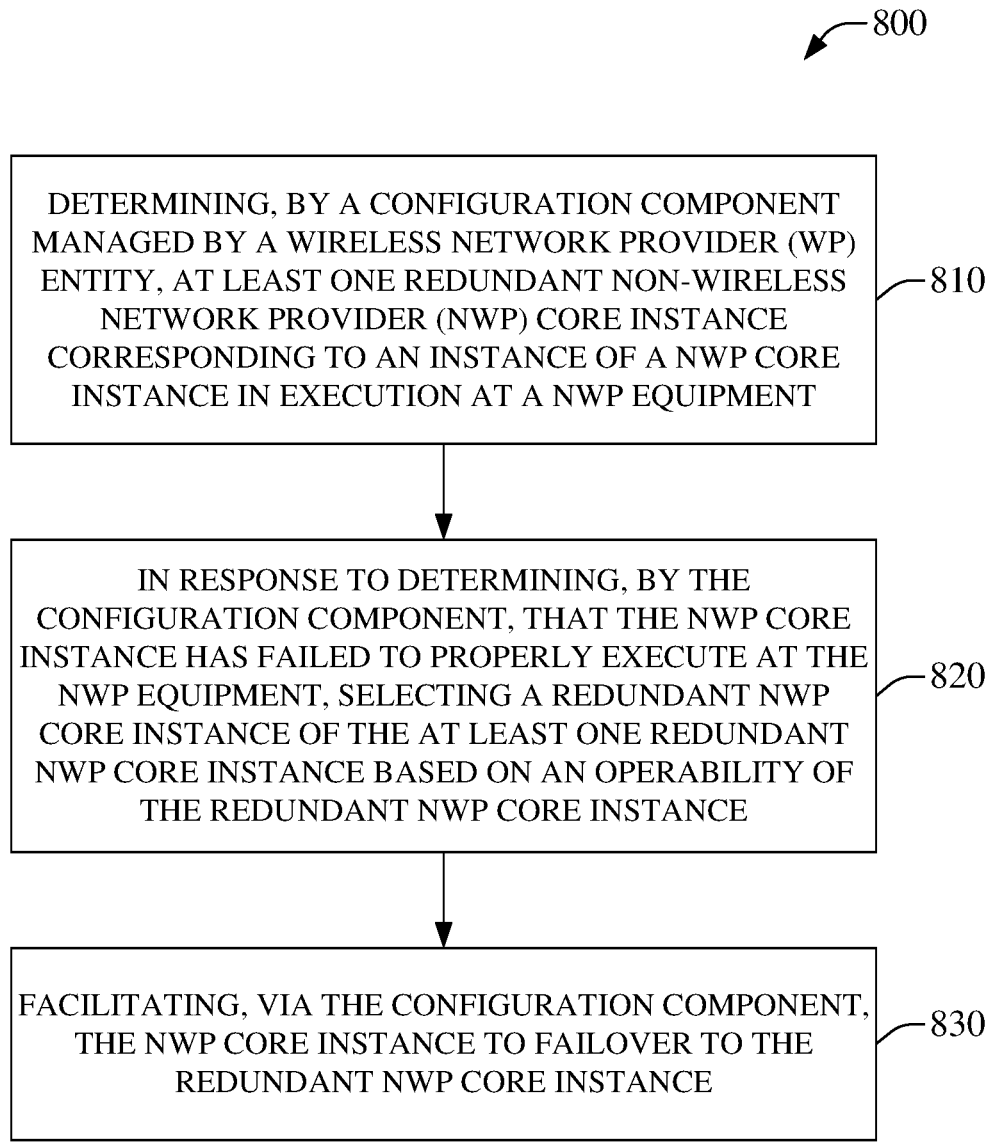
FIG. 8 illustrates an example method that enables WP equipment to generate replicate NWP cores to facilitate failover in response to determining an underperforming NWP core at NWP equipment, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternately be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600, which can enable WP equipment to facilitate implementation of a core network at NWP equipment, in accordance with aspects of the subject disclosure. At 610, method 600 can comprise receiving configuration parameters corresponding to a network of a non-wireless network provider (NWP). In an embodiment, the configuration component, e.g., WPCCC 160, 260, 264, 268, 360, 460, 560, etc., can be managed by a wireless network provider (WP) entity, e.g., via a WP-side controller component 262, 362, 562, etc. In some embodiments, the configuration component can be in execution on WP-side equipment, for example, in system 100, WPCCC 160 can be in execution at WP equipment 150. In some embodiments, the configuration component can be in execution on NWP-side equipment that can be managed, controlled, etc., by a WP-side component, for example, in system 300, WPCCC 360 can be in execution in NWP environment 302 but can be managed via WPCCC controller 362 in execution at WP equipment 350.

In an embodiment of the disclosed subject matter, configuration parameters can relate to NWP environment characteristics, for example, scope of service to be provided, types of services that will be offered, types/models/etc. of equipment comprising a NWP environment, e.g., NWP RAN equipment, NWP core network computing resources, etc., NWP authentication requirements, NWP security parameters, NWP CUPS/non-CUPS configuration, or nearly any other NWP environment characteristic or parameter that is germane to selecting and configuring a deliverable core instance or portions thereof. As an example, where a NWP entity indicates that streaming video is not to be supported, then configuration parameters can reflect this limitation such that when a NWP core is implemented it may not comprise a virtualized function corresponding to supporting streaming video. In this example, the lack of streaming video support typically would not be acceptable to a WP that serves the general public where the general public typically expects streaming video functionality, however it can be desirable for the NWP where it can allow the NWP network to employ less expensive hardware due to not needing their network to support a virtual streaming video function or meet the throughput and latency levels for streaming video to be functional.

Method 600, at 620, can comprise the configuration component determining an instance of a NWP core network based on the configuration parameters. Whereas the configuration parameters can be determined by direct interrogation of a NWP physical network environment via the configuration component, the physical constraints that will be experienced by a deployed NWP core instance can be understood. Additionally, other parameters, such as security or authentication expectations can be provided by a NWP entity to further facilitate the determining of the NWP core instance. Some embodiments facilitate interactive components via the configuration component to enable gathering some types of configuration parameters, e.g., configuration wizard applications, etc. In some embodiments, default values can be employed, wherein the default values can be supplanted by received configuration parameters. As such, a NWP core instance based on the configuration parameters can be determined.

At 630, method 600 can comprise, enabling deployment of the NWP core instance determined at 620. At this point method 600 can end. The enabling deployment can be via the configuration component, for example, the configuration component communicating the determined NWP core instance to a NWP equipment for execution, communicating between the configuration component and the NWP core instance enabling installation and configuration of the NWP core instance at NWP equipment, etc. Generally, the NWP core instance can be independent of a WP core, however, the disclosed configuration component can, in some embodiments, provide support, maintenance, updating, interoperability with a WP core, failover support, peak demand support, etc., for the NWP core instance, e.g., the NWP core can be independent of a WP core, can be friendly to a WP core, can interact with a WP core, can remain monitored and supported by WP equipment, etc.

FIG. 7 illustrates example method 700 facilitating, via WP equipment, updating of a core network executing on NWP equipment, in accordance with aspects of the subject disclosure. Method 700, at 710, can comprise receiving, by a configuration component managed by a WP entity, a configuration parameter corresponding to an instance of a NWP core instance in execution at a NWP equipment. In an embodiment, a deployed NWP core instance can source a configuration parameter value to WP-side equipment. This can facilitate monitoring of, management of, maintenance of, updating of, upgrading of, modification of, replacement of, decommissioning of, etc., a deployed NWP core instance via a WP-side equipment. In this regard, core instance support can be offered, for example as a service, to a NWP by a WP. Accordingly, a NWP core instance can be kept up to date, germane to NWP policies, such as authentication or security policies, be adapted to perform more optimally in view of a changing NWP environment, etc.

At 720, method 700 can comprise determining, by the configuration component, an updated NWP core instance. The updated NWP core instance can be based on the configuration parameter and the presently deployed NWP core instance. In an embodiment, the current NWP core instance can be associated with the configuration parameter and determining the updated NWP core instance can therefore be based on the configuration parameter, e.g., the configuration parameter can indicate where changes to an existing NWP core instance would be beneficial. As an example, the configuration parameter indicating that an existing NWP core instance is frequently operating at maximum capacity can result in determining an updated NWP core instance that comprises access to additional on-demand computing resources, improved compression technology, and tiered NWP network access via an updated authentication technique, to enable the NWP network to improve performance upon implementation of the updated NWP core instance.

Method 700 at 730 can therefore comprise enabling, by the configuration component, deploying of the updated NWP core instance for execution at NWP equipment. At this point, method 700 can end. In an embodiment, the deploying can result in updating the NWP core instance to the updated NWP core instance at the NWP equipment. In another embodiment, another NWP equipment can execute the updated NWP core and the configuration component can facilitate transitioning from the NWP core instance to the updated NWP core instance between the two different NWP equipments. Embodiments of method 700 can result in a NWP environment employing an updated, or in some circumstances a new, NWP core instance.

FIG. 8 illustrates example method 800, enabling WP equipment to generate replicate NWP cores that facilitate a failover operation in response to determining an underperforming NWP core at NWP equipment, in accordance with aspects of the subject disclosure. Method 800, at 810, can comprise a configuration component managed by a WP-entity determining at least one redundant NWP core instance. A redundant NWP core instance can correspond to a NWP core instance that is to be, or already is, in execution at a NWP equipment. A redundant NWP core instance can be substituted for a NWP core instance, e.g., failover to a redundant NWP core instance can occur where a NWP core instance fails. Failure can be in fact failure or de facto failure, e.g., performance of a NWP core instance can be degraded to a point where it can be regarded as having failed even where it may remain marginally operational.

At 820, in response to determining by the configuration component that the NWP core instance has failed, method 800 can comprise selecting a redundant NWP core instance of the one or more redundant NWP core instances. The selecting can be based on an operability of the redundant NWP core instance. As an example, where a first redundant NWP core instance is located at the same NWP equipment as the failing NWP core instance and a second redundant NWP core instance is located at another NWP equipment, then selection of the second redundant NWP core instance can be associated with greater operability because the failing NWP equipment can both cause the current failure of the existing NWP core instance as well as be an expected cause of failure of the first redundant NWP core instance located at the same NWP equipment.

Method 800, at 830, can comprise the configuration component facilitating the NWP core instance to failover to the redundant NWP core instance. At this point method 800 can end. The configuration component can indicate a location of the selected redundant NWP core instance, can facilitate transitioning to the redundant NWP core instance, can support deletion of the failed NWP core instance, etc. It is noted that failover can be in response to a catastrophic failure of a NWP core instance and, as such, monitoring of the NWP core instance by the configuration component can enable prompt failover operations to reduce NWP network downtime. Moreover, where the configuration component can maintain more than one redundant NWP core instance, particularly in different locations to protect against different types of NWP core instance failure, the configuration component can aid in keeping redundant NWP core instances up to date, in shadow operation, etc., such that failover transitioning can be more easily performed.

Figure 9:
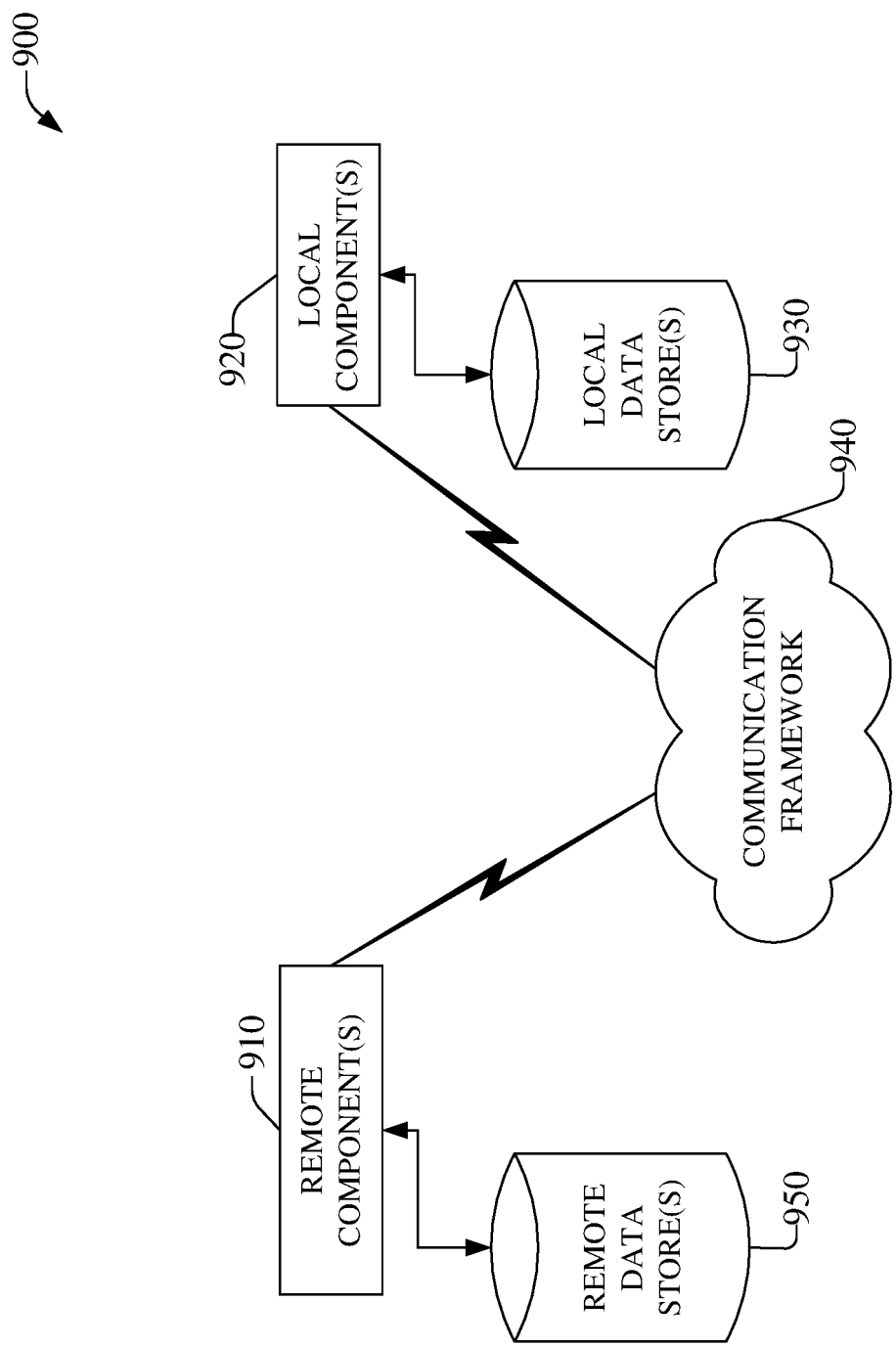
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise NWP equipment 110, 210, 310, 410, 510, 582, etc., NWP core IPAC 470, etc., WP equipment 150, 250, 350, 550, etc., or other components, for example, other components located remotely from a WPCCC instance 160, 260, 360, 460, 560, etc.

The system 900 also comprises one or more local component(s) 920. The local component(s) 920 can be hardware and/or software (e.g., threads, processes, computing devices). In some embodiments, local component(s) 920 can comprise NWP equipment 110, 210, 310, 410, 510, 582, etc., NWP core IPAC 470, etc., WP equipment 150, 250, 350, 550, etc., or other components, for example, other components located local to WPCCC instance 160, 260, 360, 460, 560, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. As an example, WPCCC 160 can locally generate a NWP core instance and facilitate remote deployment thereof, e.g., as NWP core instance 120 in execution at NWP equipment 110, e.g., via communication framework 140. Remote component(s) 910 can be operably connected to one or more remote data store(s) 950, such as a hard drive, solid state drive, SIM card, device memory, etc., that can be employed to store information on the remote component(s) 910 side of communication framework 940.

Figure 10:
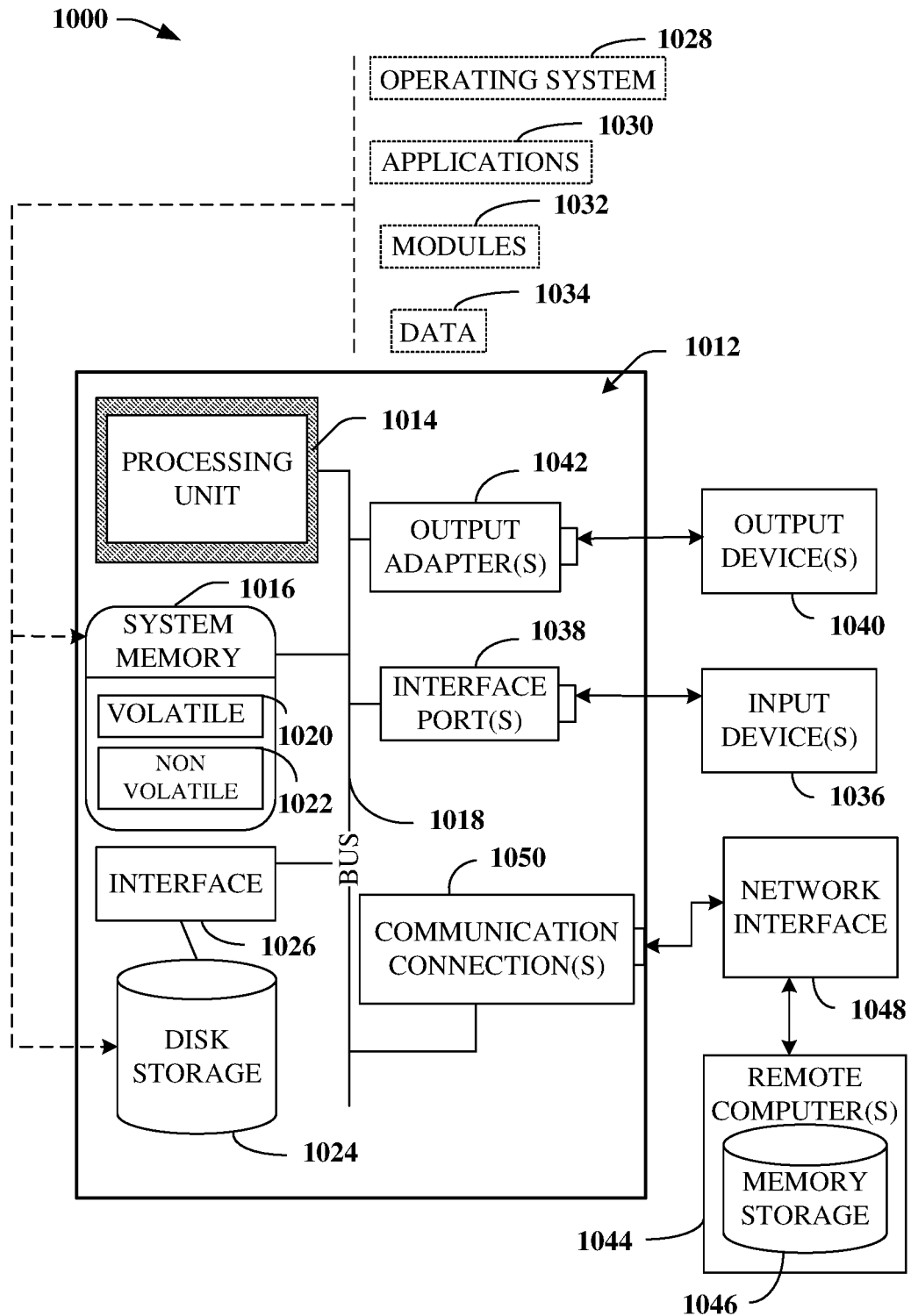
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), single board computers, microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in NWP equipment 110, 210, 310, 410, 510, 582, etc., NWP core IPAC 470, etc., WP equipment 150, 250, 350, 550, etc., or nearly any other device, can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synch-Link dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising receiving configuration parameters at a first access network equipment comprised in a first access network, wherein the configuration parameters correspond to a second access network comprising a second access network equipment that is located remotely from the first access network equipment, and wherein the second access network equipment supports operation of the second access network based on execution of a core network instance. The operations can further comprise, configuring, via the first access network equipment based on the configuration parameters, a core network instance deliverable and, in response to communicating the core network instance deliverable to the second access network equipment, enabling performing of the core network instance deliverable by the second access network equipment, resulting in the second access network employing the core network instance for access network operations.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone or other human voice sensor, accelerometer, biometric sensor, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted elsewhere herein, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," "5G network radio," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows. Data or signal information exchange can comprise technology, such as, single user (SU) multiple-input and multiple-output (MIMO) (SU MIMO) radio(s), multiple user (MU) MIMO (MU MIMO) radio(s), long-term evolution (LTE), LTE time-division duplexing (TDD), global system for mobile communications (GSM), GSM EDGE Radio Access Network (GERAN), Wi Fi, WLAN, WiMax, CDMA2000, LTE new radio-access technology (LTE-NX), massive MIMO systems, etc.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to authenticating a user-identity to a user-account. Authentication can, in some embodiments, refer to determining whether a user-identity requesting a service from a telecom network is authorized to do so within the network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to as extremely high frequency (EHF) waves. The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
   a processor; and
   a memory that stores executable instructions that, when executed by the processor, facilitate performance of operations comprising:
   determining a core network instance to be performed at network equipment located remotely from a device, wherein a first network corresponds to a national carrier entity and comprises the device, and wherein a second network corresponds to a non-national carrier entity and comprises the network equipment; and
   deploying the core network instance for operation at the network equipment.

2. The device of claim 1, wherein the non-national carrier entity is selected from a group of entities comprising a mobile virtual network operator entity, a sub-national corporate entity, a first entity corresponding to a single corporate campus, and a second entity corresponding to a residence.

3. The device of claim 1, wherein the national carrier entity serves greater than approximately one order of magnitude more user equipment than the non-national carrier entity.

4. The device of claim 1, wherein the operations further comprise:
   receiving an updated configuration parameter employable to update a configuration parameter of configuration parameters corresponding to network equipment;
   determining an updated core network instance to update the core network instance; and
   deploying the updated core network instance for operation at the network equipment.

5. The device of claim 1, wherein the operations further comprise:
   based on the core network instance, determining a redundant core network instance that enables redundant functionality to the core network instance.

6. The device of claim 5, wherein the operations further comprise:
   implementing a failover operation corresponding to the redundant core network instance.

7. The device of claim 6, wherein implementing the failover operation comprises, based on an operability value associated with the redundant core network instance, selecting the redundant core network instance from among redundant core network instances.

8. The device of claim 5, wherein the second network comprises the redundant core network instance.

9. The device of claim 5, wherein the first network comprises the redundant core network instance.

10. A method, comprising:
    determining, by first access network equipment comprising a processor and based on configuration parameters corresponding to a second access network, a core network instance, wherein a first access network corresponds to a national carrier entity and comprises the first access network equipment, and wherein the second access network corresponds to a non-national carrier entity and comprises second access network equipment; and
    enabling, by the first access network equipment, implementation of the core network instance at the second access network equipment, wherein the core network instance facilitates access to the second access network.

11. The method of claim 10, further comprising:
    receiving, by the first access network equipment, an updated configuration parameter; and
    based on the updated configuration parameter, facilitating, by the first access network equipment, updating the core network instance at the second access network equipment, resulting in an updated core network instance, wherein the updated core network instance facilitates access to the second access network.

12. The method of claim 10, further comprising:
    determining, by the first access network equipment and based on the core network instance, a redundant core network instance that enables redundant functionality to the core network instance; and
    facilitating, by the first access network equipment, a failover operation corresponding to the redundant core network instance, wherein the failover operation is triggered in response to a determination that the core network instance is failing to perform according to a defined performance criterion.

13. The method of claim 12, wherein determining the redundant core network instance comprises selecting, by first access network equipment and based on a location of the redundant core network instance, the redundant core network instance from among a group of redundant core network instances.

14. The method of claim 10, wherein the non-national carrier entity is selected from a group of entities comprising a mobile virtual network operator entity, a sub-national corporate entity, an entity corresponding to a single corporate campus, and an entity corresponding to a residence.

15. The method of claim 10, wherein the national carrier entity serves greater than approximately one order of magnitude more user equipment than the non-national carrier entity.

16. A non-transitory machine-readable medium, comprising executable instructions that, when executed by a processor of first access network equipment comprised in a first access network, facilitate performance of operations, comprising:

based on configuration parameters corresponding to a second access network comprising second access network equipment located remotely from the first access network equipment, configuring a core network instance deliverable, wherein the first access network corresponds to a national carrier entity, and wherein the second access network corresponds to a non-national carrier entity; and in response to transmitting the core network instance deliverable to the second access network equipment, enabling a core network instance associated with the core network instance deliverable.

17. The non-transitory machine-readable medium of claim 16, wherein the first access network equipment generates an updated core network instance deliverable based on an updated configuration parameter, and wherein the first access network equipment enables the updated core network instance deliverable for the second access network equipment.

18. The non-transitory machine-readable medium of claim 16, wherein the first access network equipment generates a redundant core network instance deliverable based on the core network instance deliverable, and wherein the first access network equipment enables the redundant core network instance deliverable for third access network equipment of the second access network.

19. The non-transitory machine-readable medium of claim 16, wherein the non-national carrier entity is selected from a group of entities comprising a mobile virtual network operator entity, a sub-national corporate entity, an entity corresponding to a single corporate campus, and an entity corresponding to a residence.

20. The non-transitory machine-readable medium of claim 16, wherein the national carrier entity serves greater than approximately one order of magnitude more user equipment than the non-national carrier entity.

* * * * *